United States Patent
Kelley et al.

(10) Patent No.: US 6,421,756 B1
(45) Date of Patent: Jul. 16, 2002

(54) BUFFER ASSIGNMENT FOR BRIDGES

(75) Inventors: Richard A. Kelley, Apex, NC (US); Danny Marvin Neal, Round Rock; Steven Mark Thurber, Austin, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/306,200

(22) Filed: May 6, 1999

(51) Int. Cl.[7] .......................... G06F 13/40; G06F 13/14
(52) U.S. Cl. .......................................... 710/310; 710/56
(58) Field of Search ...................... 710/52–57, 305–315

(56) References Cited

U.S. PATENT DOCUMENTS

| | | | | |
|---|---|---|---|---|
| 4,603,382 A | * | 7/1986 | Cole et al. ..................... | 710/56 |
| 5,014,265 A | * | 5/1991 | Hahne et al. ................ | 370/236 |
| 5,412,781 A | * | 5/1995 | Lukas et al. .................. | 710/56 |
| 5,432,908 A | * | 7/1995 | Heddes et al. .............. | 711/147 |
| 5,521,923 A | * | 5/1996 | Willmann et al. .......... | 370/412 |
| 5,802,055 A | * | 9/1998 | Krein et al. ................. | 370/402 |
| 5,838,994 A | * | 11/1998 | Valizadeh .................... | 710/56 |
| 5,907,717 A | * | 5/1999 | Ellis ............................ | 370/360 |
| 5,916,309 A | * | 6/1999 | Brown et al. ................. | 710/52 |
| 5,964,859 A | * | 10/1999 | Steinbach et al. .......... | 710/129 |
| 6,021,132 A | * | 2/2000 | Muller et al. ................ | 370/412 |
| 6,046,817 A | * | 4/2000 | Brown et al. .............. | 358/1.16 |
| 6,073,190 A | * | 6/2000 | Rooney ......................... | 710/56 |
| 6,195,331 B1 | * | 2/2001 | Tani ............................ | 370/230 |
| 6,240,066 B1 | * | 5/2001 | Nagarajan et al. .......... | 370/230 |

* cited by examiner

*Primary Examiner*—Sumati Lefkowitz
(74) *Attorney, Agent, or Firm*—Robert V. Wilder; Mark E. McBurney

(57) ABSTRACT

A method and implementing computer system are provided in which bridge buffers are grouped together in a pool, and are dynamically assigned and unassigned to adapter devices as needed during information transfers. In an exemplary peripheral component interconnect (PCI) system embodiment, a PCI Host Bridge (PHB) is coupled to a first PCI bus and one of the devices of the first PCI bus is occupied by a PCI-PCI bridge (PPB) which couples the first PCI bus to a second PCI bus. An assignment of PHB buffers in the PHB is made relative to the number of PCI devices which are connected both directly and indirectly to the first PCI bus. Devices on both the first and second PCI busses are given approximately equal status in the buffer assignment process. Upon a completion of a data transfer to or from any one of the adapters, the freed-up buffers which were assigned to that particular adapter are dynamically reassigned to other adapters as needed to optimize use of all of the buffers in the PHB pool.

14 Claims, 5 Drawing Sheets

BUFFER ASSIGNMENT FOR BRIDGES

FIELD OF THE INVENTION

The present invention relates generally to information processing systems and more particularly to an improved information transfer methodology in a computer related environment.

BACKGROUND OF THE INVENTION

As computer systems and networked computer systems proliferate, and become integrated into more and more information processing systems which are vital to businesses and industries, there is an increasing need for faster information processing and increased data handling capacity. Even with the relatively rapid state-of-the-art advances in processor technology, and the resulting increased processor speeds, a need still exists for faster processors and increased system speeds and bandwidths. As new applications for computers are implemented, new programs are developed and those programs are enriched with new capabilities almost on a daily basis. While such rapid development is highly desirable, there is a capability cost in terms of system speed and bandwidth.

As used herein, the term "bandwidth" is used generally to refer to the amount of information that can be transferred in a given period of time. In transferring information between devices in a computer system, information is frequently temporarily stored in buffers along the path of the information transfer. Such buffers include bridge buffers which are generally located in bridge circuits connecting devices or busses between which the information is to be transferred. In one example, peripheral component interconnect or "PCI" system bridge circuit buffers are assigned to PCI devices, which are installed in PCI "slots" and coupled to an associated PCI bus. Complex computer systems may include many bridge circuits connected between individual PCI busses or connecting a PCI bus to a system bus. In a PCI system, any of the computer system enhancement devices or adapters are generally included on one or more circuit boards which are mounted or inserted into PCI "slots", i.e. into board connector terminals mounted on a system motherboard.

In general, each PCI bus is connected to a next higher level bus in the system through a PCI bridge circuit. Each PCI bus in a system may have up to four slots (at 33 MHz) for devices or adapters connected to the PCI bus. In extensive computer systems, PCI busses are connected to other PCI busses through PCI-to-PCI bridge circuits which are, in turn, connected to one or more of the slots on higher level PCI busses. Each bridge circuit in the system includes a number of buffers which have been, in the past, assigned to corresponding ones of the PCI slots, for use in temporarily storing information transferred to and from the corresponding assigned devices installed in the PCI slots of the system. For example, in FIG. 1, a typical PCI system includes one or more CPUs 101, 105, which are connected to a system bus 103. A memory controller 107 and memory unit 109 are also connected to the system bus 103. The bus 103 is extended 111 for further system connections to other system devices and networks which are known in the art but are not specifically illustrated in order not to obfuscate the drawings and distract from the disclosure of the present invention.

The system bus 103 is also coupled through a PCI Host Bridge (PHB) circuit 113 to a first PCI bus 119. The PHB 113 is shown to include a group of buffers 117 and an arbitrator circuit 115. The first PCI bus 119 includes four devices designated "S1", "S2", "S3" and "S4" which are arranged for receiving PCI devices such as I/O adapter devices "A" 121, "B" 123, and "C" 125. The fourth device in the example is a PCI-to-PCI bridge (PPB) 127 to a second PCI bus 129. The second PCI bus is shown to be connected to three additional I/O adapter devices "E" 131, "F" 133 and "G" 135. Each of the PCI devices on the PCI bus has separate "request" (REQ) and "grant" (GNT) lines to the PHB 113 as illustrated such that each PCI device may request and receive control from the arbitrator circuit 115 of the PCI bus 119 for information transfers. The devices under the PPB would request the bus through an arbiter in the PPB.

In the past, the buffers 117 were usually available for any device to utilize, and in some cases, depending on the arbiter utilized, some devices could be temporarily deprived of available buffers because each time a device is granted the bus, it could find that the buffers are full.

Thus there is a need for an improved methodology and implementing system which enables a more advantageous use of buffer availability in transferring information between devices connected within the system.

SUMMARY OF THE INVENTION

A method and implementing computer system is provided in which bridge buffers are grouped together in a pool, and are dynamically assigned and unassigned to devices on the bus based on an "as needed" basis for information transfers. In an exemplary PCI system embodiment, a PHB is coupled to a first PCI bus and one of the devices on the first PCI bus is a PPB which couples the first PCI bus to a second PCI bus. An initial assignment of PHB buffers in the PHB is made relative to the number of PCI adapter devices which are connected both directly and indirectly to the first PCI bus. Devices on both the first and second PCI busses are given approximately equal status in the buffer assignment process. Upon a completion of a data transfer to or from any one of the adapters, the freed-up buffers which were assigned to that particular adapter are dynamically made available and re-assigned to other adapters as needed to optimize use of all of the buffers in the PHB pool.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented within a typical computer system which may include a server, workstation, or personal computer. In general, an implementing computer system may include a plurality of processors in a multi-bus system within a network of similar systems. However, since the workstation or computer system in which the present invention may be implemented is generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention.

As hereinafter explained in detail, the disclosed methodology is effective in connection with a PCI bus system which utilizes effective posted memory write transactions and delayed read and delayed write transactions. This approach is also effective with high performance future extensions of the PCI Local Bus Specification ("PCI-X"), which utilizes posted memory write transactions and split read and split write transactions. PCI ordering rules require that read transactions "push" previous write transactions ahead of them. In the case of delayed transactions for PCI, the master that initiates the request must get back on the bus and repeat the original request again and again until the transaction completes. Split transactions are different from delayed transactions in that the split request receives a split response on the bus instead of a Retry. The master does not need to continue repeating the request. The target of that request will obtain the bus later and will act at that time as a master on the bus and provide split completion data or message back to the original master. The original master will then act as a target to receive the completion data or message.

Dynamically assigning buffers by device arbitration level or by a device ID results in a read having to only push previous writes originating from the same device. This approach not only assures that each device receives a minimum number of buffers, but also reduces the latency and improves subsystem performance. This approach can be used for both read and write buffers. Therefore the approach may utilize one or more pools of buffers for both the inbound (toward system memory) and outbound directions.

Figure 1:
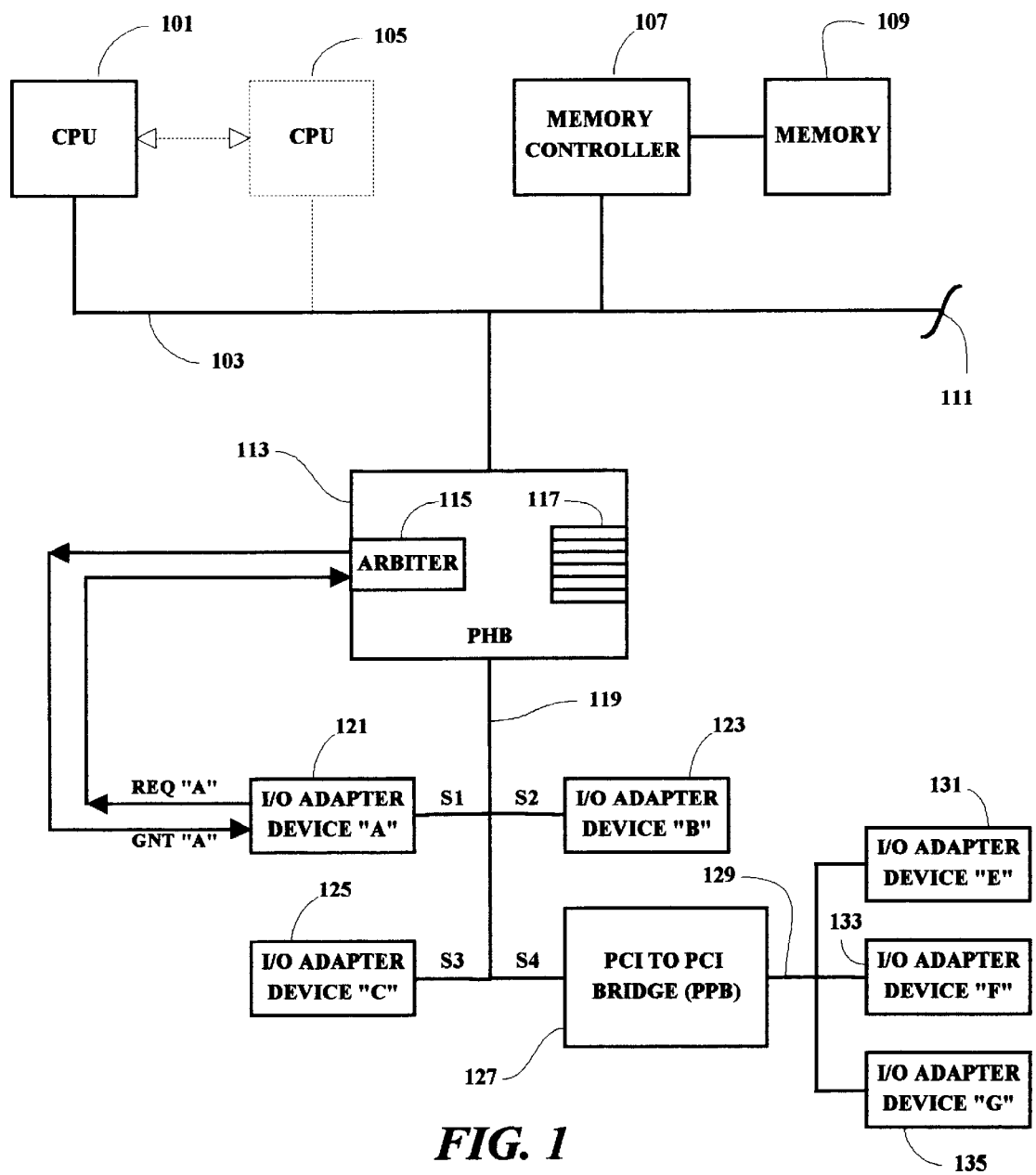
FIG. 1 is a diagram of a computer system in which the present invention may be implemented.

The exemplary computer system shown in FIG. 1 may be implemented and operated in accordance with the methodology hereinafter disclosed to accomplish the objectives of the present invention. In accordance with the present invention, more buffers in the host bridge are assigned to the PCI-to-PCI bridge 127 than to the other devices on the first PCI bus 119 in order to more efficiently process information transfers within the system. In the example, the PHB 113 includes a total of 12 buffers. When buffers are assigned by arbitration level, the I/O devices or adapters on the primary bus 119 can be assigned two buffers each and the PPB can be assigned 6 buffers since there are three I/O devices on the second PCI bus 129, i.e. each of the six devices 121,123, 125,131, 133 and 135 will have two buffers assigned for use in information transfers. In the general case, the primary assignment on the primary PCI bus 119 can also be made based on the expected bandwidth needs of the devices on that bus. A hardfile controller would be expected to need a larger bandwidth than a local area network (LAN) controller and therefore be assigned a larger number of buffers than the LAN controller.

When buffers are assigned dynamically, by arbitration level or device ID, from a pool of buffers, the PHB 113 is able to more efficiently make use of its buffers thereby reducing latency and improving performance. When the PPB 127 is allowed to use 6 buffers for example, and only 5 of its minimum allotment are currently in use, the PPB would be allowed to use another buffer from the shared pool even when there are only one or two buffers left in the pool. When there are a total of three I/O devices 121, 123 and 125, along with the PPB 127, on the primary PCI bus 119, and twelve buffers are available in the buffer pool, each of the I/O devices would be allowed to use up to two buffers (even though there may be only one or two left in the pool), and the PPB 127 would be allowed to use six buffers. When more than two buffers are available for use in the pool, any device can use another buffer independently of the number of buffers that the device is currently using. However, each device including the PPB that is currently using more than its minimum amount allocated, may receive a "retry" (see PCI Specification Rev. 2.2, dated Dec. 18, 1998) on subsequent requests as other devices request the bus and are allocated their minimum amount of buffers. As transactions complete and buffers are returned to the pool, devices that may temporarily use more than the device's minimum allotment will not be assigned an additional transaction buffer until more than two transaction buffers are available.

Figure 2:
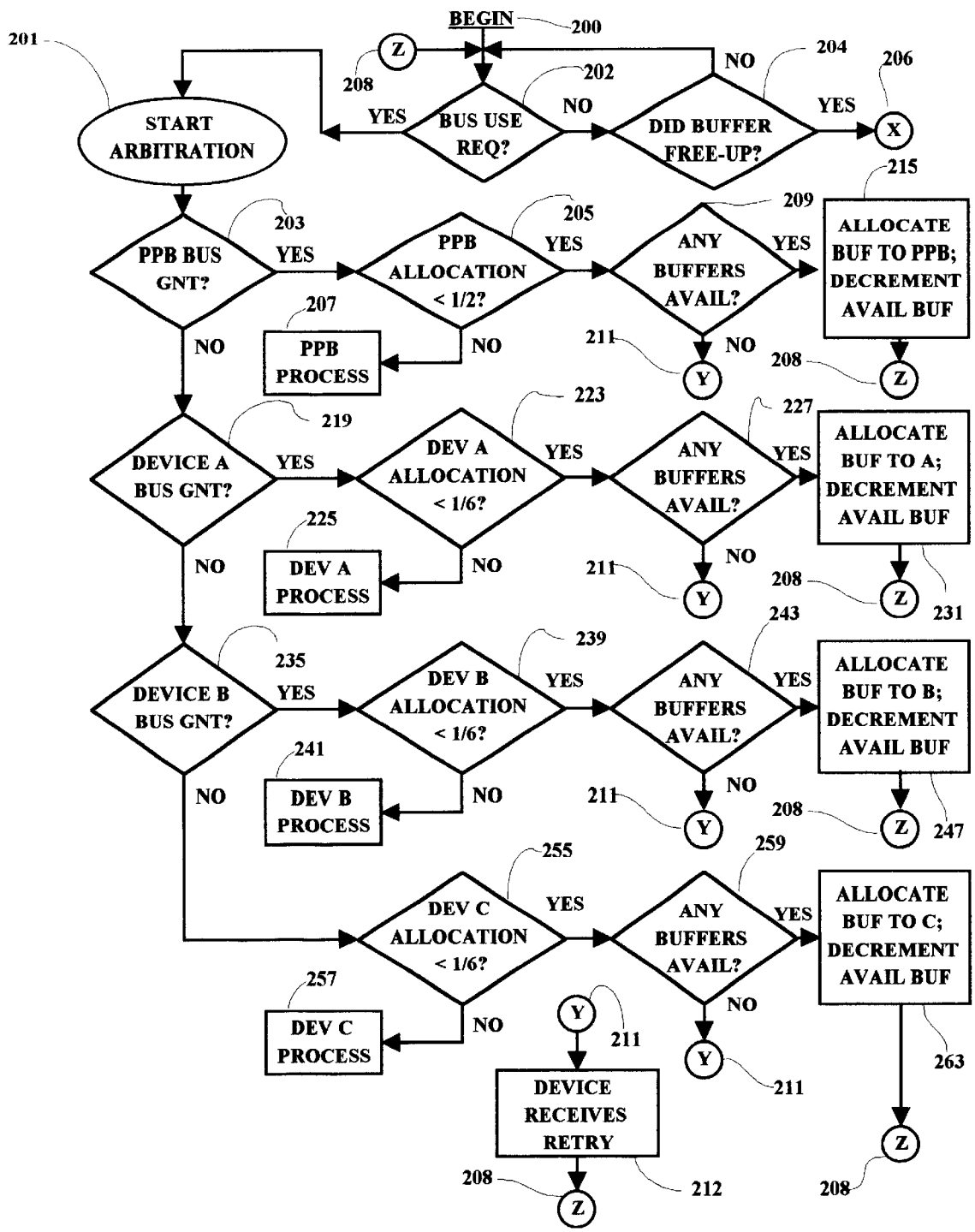
FIG. 2 is a flow chart illustrating an exemplary operational sequence of the methodology of the present invention.

In the following description, since the approach is applicable to both conventional PCI and PCI-X transactions, references to a "PHB" or "PPB" are intended to apply to both PCI and PCI-X operations. As shown in FIG. 2, in an exemplary operational sequence, the information transfer processing begins 200 and a determination is made as to whether control of the PCI bus is requested 202 by one of the devices or I/O adapters in the system. When no request is being made for the first PCI bus 119, a check is made to determine if one of the buffers previously in use has been freed up or made available 204. If a previously used buffer has become available 204 the methodology continues by going to point "X" 206 for further processing to be later explained. If no buffer has become available 204, the process returns to monitor for subsequent PCI bus requests. When a PCI bus request has been detected, an arbitration process is initiated 201 in the arbiter circuit 115, and a check is made to determine which device is granted the PCI bus.

When it is determined 203 that the PPB 127 is granted the PCI bus 119 for example for a data transfer, a check is made 205 to determine if the current PPB allocation of buffers 117 is less than one-half of the total number of buffers. In the present example, since the total number of buffers in the pool 117 is twelve, one-half of the total buffers would be six buffers that would be assigned as a base number for PPB usage in transferring data. If the current allocation of buffers to the PPB is not less than one-half or six buffers 205, then the method continues with a PPB processing step 207 which is explained later. If the PPB allocation is less than one-half of the total of 12 buffers 205, then a check is first made 209 to determine if any buffers are available. If not, the process goes to point "Y", which as shown in the lower portion of FIG. 2, initiates a device retry 212 and the method then continues to point "Z" to again check for a PCI bus request 202. If buffers have been determined to be available 209, then another buffer is allocated 215 to the PPB 127 and a maintained buffer available count is decremented by one, and the process returns to check for a PCI bus use request 202.

When it is determined that device "A" has been granted use of the PCI bus 219, a check is made 223 to determine if the current device "A" allocation of buffers 117 is less than one-sixth of the total number of buffers, i.e. less than two in the present example, since the total number of buffers in the pool 117 is twelve. If the current allocation of buffers to device "A" 121 is not less than one-sixth or two buffers 223, then the method continues with a device "A" processing step 225 which is explained later. If the PPB allocation is less than one-sixth of the total of 12 buffers 223, then a check is first made 227 to determine if any buffers are available. If no buffers are available, the process goes to point "Y" 211, which initiates a device retry 212 and the method then continues to point "Z" 208 to again check for a PCI bus requests 202. If buffers have been determined to be available 227, then a buffer is allocated 231 to the "A" device 121, a maintained buffer available count is decremented by one, and the process returns to check for another PCI bus use request 202.

When it is determined that device "B" has requested use of the PCI bus 235, a check is made 239 to determine if the current device "B" allocation of buffers 117 is less than one-sixth of the total number of buffers, i.e. less than two in the present example, since the total number of buffers in the pool 117 is twelve. If the current allocation of buffers to device "B" 123 is not less than one-sixth or two buffers 239, then the method continues with a device "B" processing step 241 which is explained later. If the "B" device allocation is less than one-sixth of the total of 12 buffers 239, then a check is first made 243 to determine if any buffers are available. If no buffers are available, the process goes to point "Y" 211, which initiates a device retry 212 and the method then continues to point "Z" 208 to again check for a PCI bus requests 202. If buffers have been determined to be available 243, then a buffer is allocated 247 to the "B" device 123, a maintained buffer available count is decremented by one, and the process returns to check for another PCI bus use request 202.

When it is determined that neither the PPB nor device A or B was granted the bus, then it is determined that device "C" has been granted use of the PCI bus 235, and a check is made 255 to determine if the current device "C" allocation of buffers 117 is less than one-sixth of the total number of buffers, i.e. less than two in the present example. If the current allocation of buffers to device "C" 125 is not less than one-sixth or two buffers 255, then the method continues with a device "C" processing step 257 which is explained later. If the device "C" allocation is less than one-sixth of the total of 12 buffers 255, then a check is first made 259 to determine if any buffers are available. If no buffers are available, the process goes to point "Y" 211, which initiates a device retry 212 and the method then continues to point "Z" 208 to again check for a PCI bus requests 202. If buffers have been determined to be available 259, then a buffer is allocated 263 to the "C" device 125, a maintained buffer available count is decremented by one, and the process returns to check for another PCI bus use request 202.

In the event that a PCI bus request is made and the allocation of buffers for the device granted the bus is equal to or greater than the allocation for that device (i.e. not "less than"), then, in order to assign an optimum number of buffers to the requesting device depending upon how many of the buffers from the buffer pool are currently being used by other devices, the buffer assignment optimization process is further executed. In other words, when a device is granted the bus, the system may assign additional buffers to the requesting device even though the requesting device has already been assigned its per-device share of buffers from the buffer pool. This is made possible through the dynamic assignment of pooled buffers to requesting PCI devices or I/O adapters. This portion of the optimizing process is illustrated in flow chart form in FIGS. 3–6.

Figure 3:
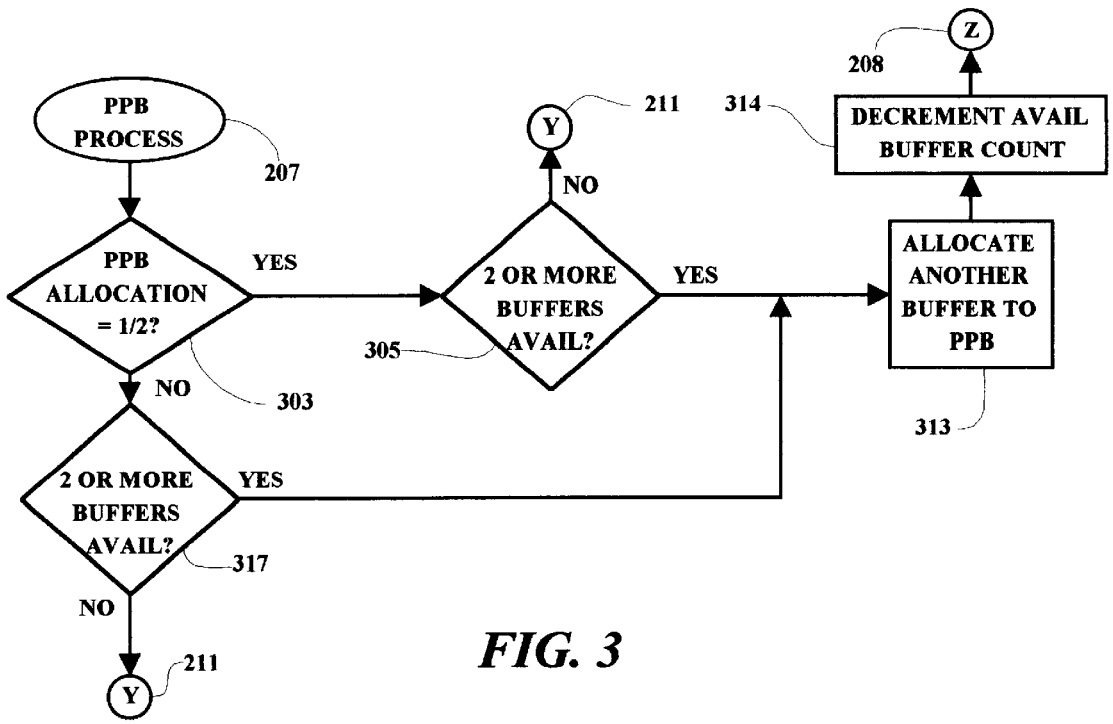
FIG. 3 is a flow chart showing an exemplary operational sequence of a portion of the methodology shown in FIG. 1.

As shown in FIG. 3, the PPB process 207, which occurs when it has been determined 205 that the PPB allocation of buffers from the buffer pool 117 is not less than one-half of the total number of buffers, first determines if the allocation is equal to one-half 303. If the PPB allocation is equal to one-half 303, then a check is made 305 to determine if two or more buffers are available. If two or more buffers have been found to be available 305 then another buffer is allocated to the PPB 313, the maintained available buffer count is decremented by one 314, and the process returns to point "Z" 208 to check for the next bus use request 202. If it is determined that the PPB allocation is not equal to one-half 303, it means that the PPB allocation must be greater than one-half and the PPB already has more than its share of buffers assigned. Nevertheless, a check is made to determine if two or more buffers are available 317. If two or more buffers are not available 317, the process returns to point "Y" 211 (FIG. 1), the device receives a retry 212 and then returns to check for the next bus use request 202. If it is determined that two or more buffers are available 317 (FIG. 3), then another buffer is allocated to the PPB 313, the available buffer count is decremented by one 314 and the process returns to check for the next bus use request 202. Thus, depending upon the availability of buffers in the pool 117, a device may be assigned more than that device's share of pool buffers on a dynamic or per-transaction basis, and this dynamic assignment of pooled buffers optimizes buffer usage and provides additional bandwidth for the transfer of information to and from the PCI adapters.

Figure 4:
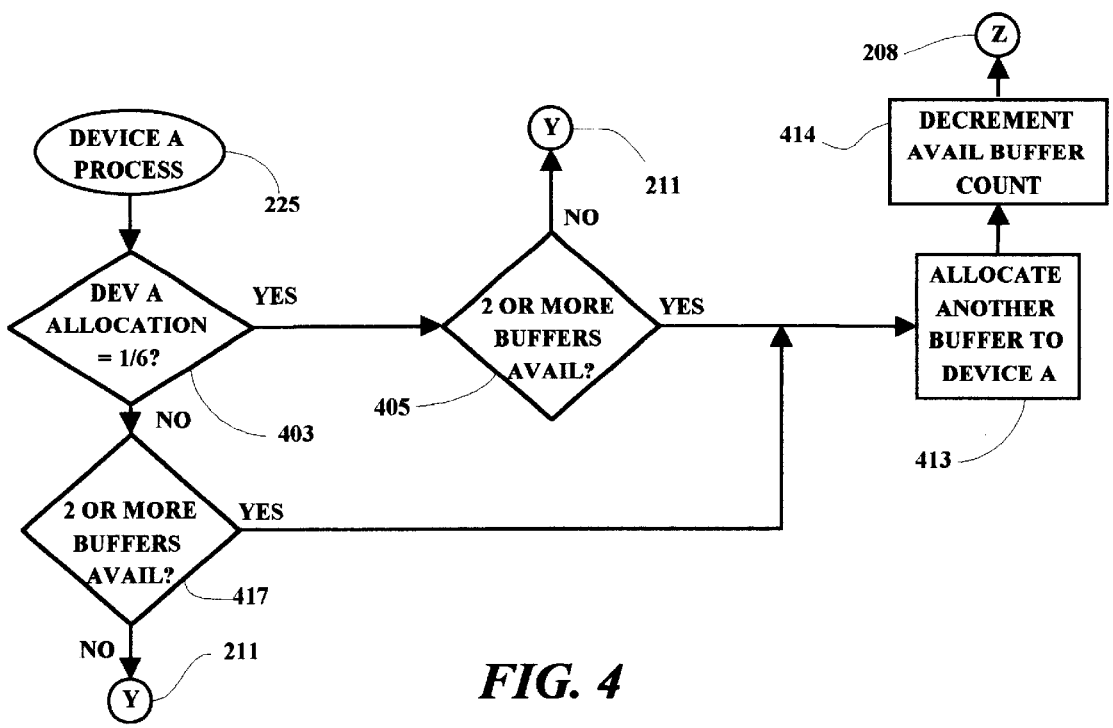
FIG. 4 is a flow chart showing an exemplary operational sequence of another portion of the methodology shown in FIG. 1.

In FIG. 4, the device A process 225 occurs when it has been determined 223 that the device A allocation of buffers from the buffer pool 117 is not less than one-sixth of the total number of buffers. A check is made to determine if the allocation is equal to one-sixth 403. If the device A allocation is equal to one-sixth 403, then a check is made 405 to determine if two or more buffers are available. If two or more buffers have been found to be available 405 then another buffer is allocated to device A 413, the maintained available buffer count is decremented by one 414, and the process returns to point "Z" 208 to check for the next bus use request 202. If it is determined that the device A allocation is not equal to one-sixth 403, it means that the device A allocation must be greater than one-sixth and device A already has more than its "per-device" share of buffers assigned. Nevertheless, a check is made to determine if two or more buffers are available 417. If two or more buffers are not available 417, the process returns to point "Y" 211 (FIG. 1), the A device 121 receives a retry 212 and the process returns to check for the next bus use request 202. If it is determined that two or more buffers are available 417 (FIG. 4), then another buffer is allocated to the A device 121, the available buffer count is decremented by one 414 and the process returns to check for the next bus use request 202.

Figure 5:
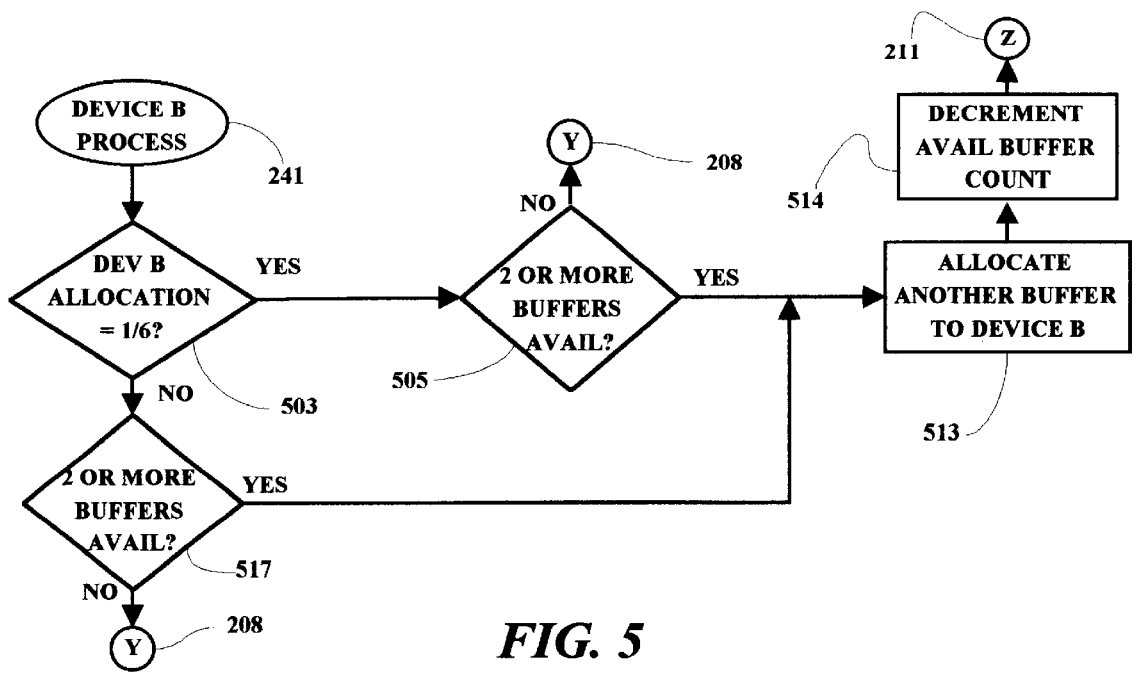
FIG. 5 is a flow chart showing an exemplary operational sequence of another portion of the methodology shown in FIG. 1.

As shown in FIG. 5, the device B process 241 occurs when it has been determined 239 that the device B allocation of buffers from the buffer pool 117 is not less than one-sixth of the total number of buffers. A check is made to determine if the allocation is equal to one-sixth 503. If the device B allocation is equal to one-sixth 503, then a check is made 505 to determine if two or more buffers are available. If two or more buffers are found to be available 505 then another buffer is allocated to device B 513, the maintained available buffer count is decremented by one 514, and the process returns to point "Z" 208 to check for the next bus use request 202. If it is determined that the device B allocation is not equal to one-sixth 503, it means that the device B allocation must be greater than one-sixth and device B already has more than its "per-device" share of buffers assigned. Nevertheless, a check is made to determine if two or more buffers are available 517. If two or more buffers are not available 517, the process returns to point "Y" 211 (FIG. 1), the B device 123 receives a retry 212 and the process returns to check for the next bus use request 202. If it is determined that two or more buffers are available 517 (FIG. 5), then another buffer is allocated to the B device 123, the available buffer count is decremented by one 514 and the process returns to check for the next bus use request 202.

Figure 6:
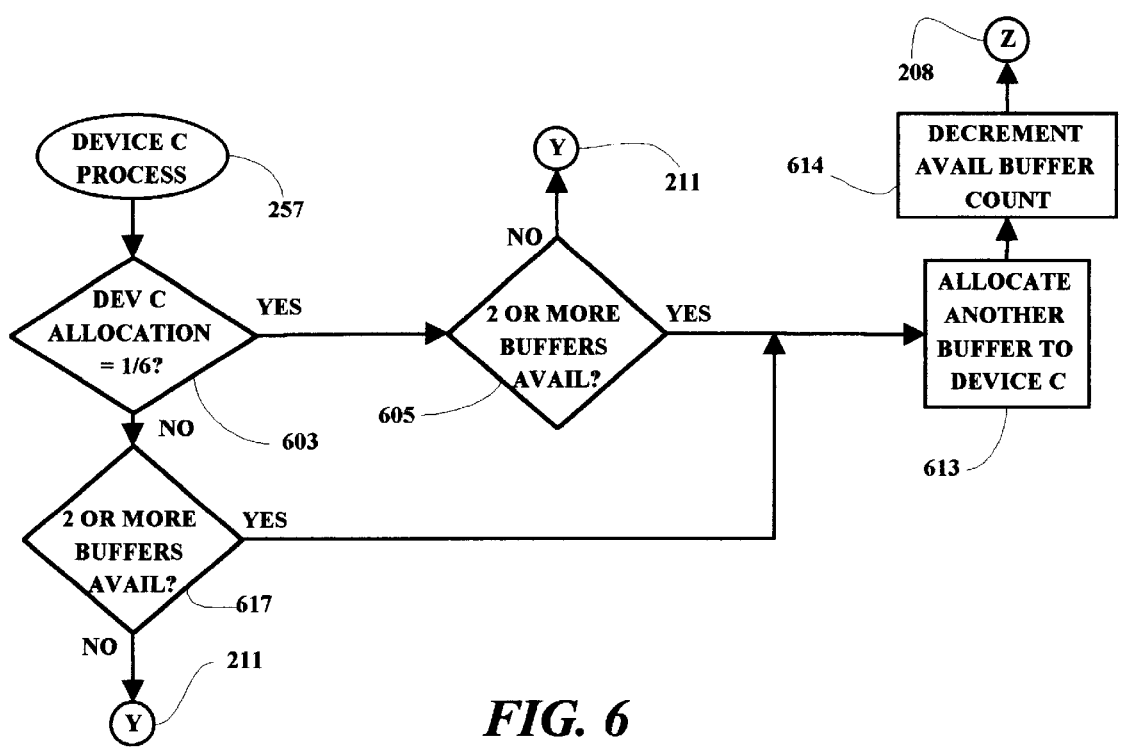
FIG. 6 is a flow chart showing an exemplary operational sequence of another portion of the methodology shown in FIG. 1.

In FIG. 6, the device C process 257 occurs when it has been determined 255 that the device C allocation of buffers from the buffer pool 117 is not less than one-sixth of the total number of buffers. A check is made to determine if the allocation is equal to one-sixth 603. If the device C allocation is equal to one-sixth 603, then a check is made 605 to determine if two or more buffers are available. If two or more buffers are found to be available 605 then another buffer is allocated to device C 613, the maintained available buffer count is decremented by one 614, and the process returns to point "Z" 208 to check for the next bus use request 202. If it is determined that the device C allocation is not equal to one-sixth 603, it means that the device C allocation must be greater than one-sixth and device C already has more than its "per-device" share of buffers assigned. Nevertheless, a check is made to determine if two or more buffers are available 617. If two or more buffers are not available 617, the process returns to point "Y" 211 (FIG. 1), the C device 125 receives a retry 212 and the process returns to check for the next bus use request 202. If it is determined that two or more buffers are available 617 (FIG. 6), then another buffer is allocated to the C device 125, the available buffer count is decremented by one 614 and the process returns to check for the next bus use request 202.

Figure 7:
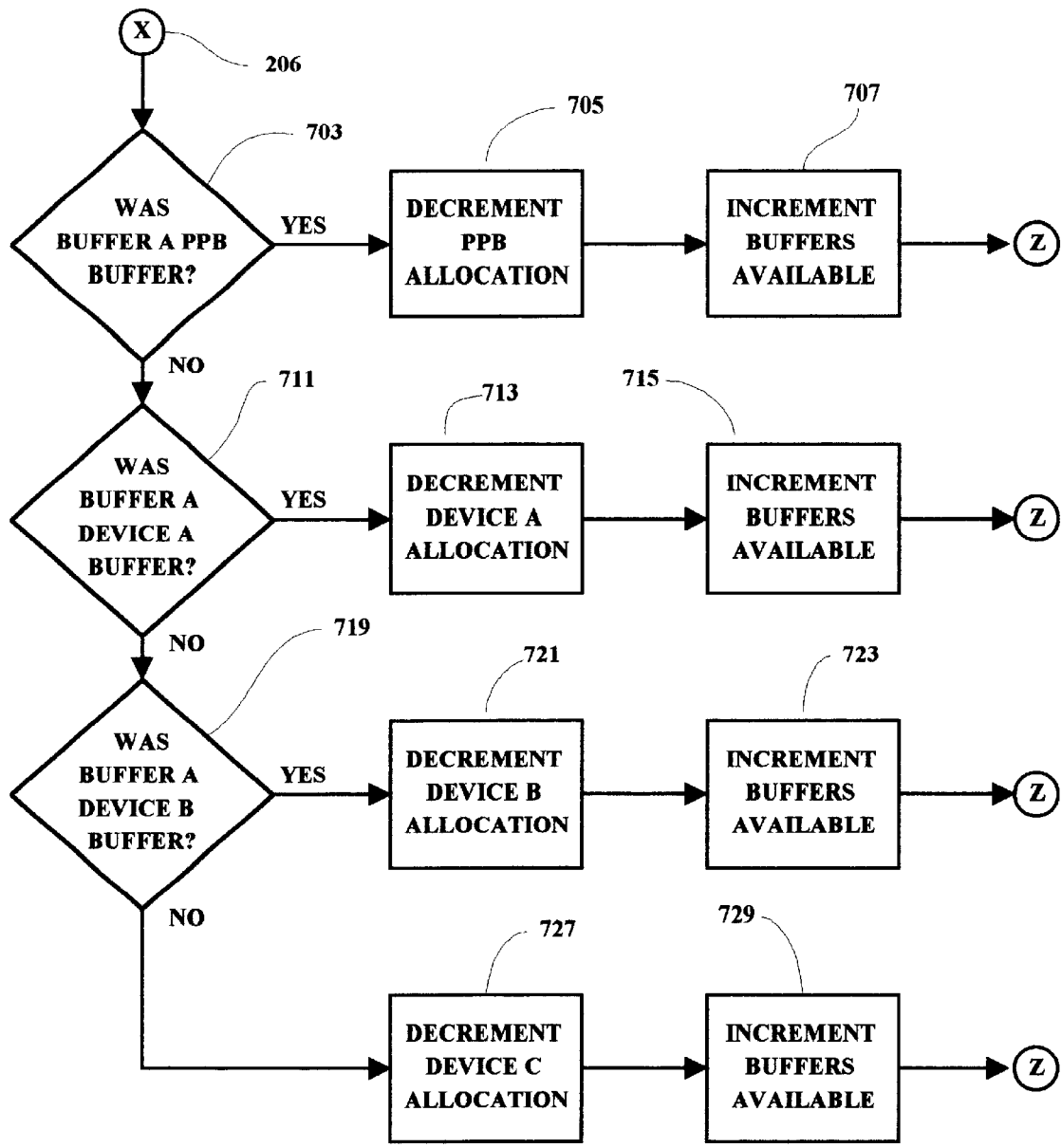
FIG. 7 is a flow chart showing an exemplary operational sequence of another portion of the methodology shown in FIG. 1.

As hereinbefore noted, in FIG. 2 a determination is made when a buffer has been freed-up 204, and is no longer being used by the device to which the buffer had been assigned for an earlier information transfer to or from the assigned device. The next sequence in the methodology is illustrated in the FIG. 7 flow chart. In FIG. 7, a check is made to determine if the freed-up buffer had been a PPB buffer 703. If the freed-up buffer was a PPB buffer 703 then the PPB buffer allocation count is decremented 705, the buffers available for reassignment is incremented by one 707 and the process returns to point "Z" (FIG. 1) to await the next request for bus use. Similarly, if the freed buffer was a device A buffer 711, the device A allocation is decremented by one 713, the buffers available count is incremented by one 715 and the process continues at point "Z". If the freed buffer was a B device buffer 719, the B device allocation is decremented by one 721, the buffers available count is incremented by one 723 and the process continues to point "Z". If the freed buffer was not a PPB buffer 703, or a device A buffer 711 or a device B buffer 719, then the freed buffer was a device C buffer and the device C allocation is decremented by one 727, the buffers available count is incremented by one 729 and the process returns to point "Z".

The method and apparatus of the present invention has been described in connection with a preferred embodiment as disclosed herein. The disclosed methodology may be implemented in a wide range of sequences to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other system integrated circuit or chip. The disclosed methodology may also be implemented solely in program code stored on a disk or diskette (portable or fixed), or other memory device, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for assigning buffers from a group of buffers to electronic devices for use in transfers of information to and from said electronic devices, said method comprising:
    assigning an allocation number of buffers from said group to each of said devices;
    marking buffers in said group as available buffers when not being used during an information transfer;
    maintaining a record of a number of said available buffers;
    determining a minimal acceptable number of available buffers necessary to accomplish information transfers at a minimal acceptable transfer efficiency;
    detecting a request for a current information transfer from a requesting one of said devices;
    assigning available buffers for use in said current transfer until a number of buffers being used in said current transfer attains a predetermined relationship with said allocation number for said requesting one of said devices;
    after said attainment of said predetermined relationship, assigning additional available buffers for use in said current transfer only so long as a number of available buffers is greater than or equal to said minimal acceptable number of said available buffers.

2. The method as set forth in claim 1 wherein said predetermined relationship is attained when said number of buffers being used in said current transfer is equal to said allocation number of said requesting device.

3. The method as set forth in claim 1 wherein said predetermined relationship is attained when said number of buffers being used in said current transfer is greater than said allocation number of said requesting device.

4. The method as set forth in claim 1 wherein said group of buffers is connected within a bridge circuit, said bridge circuit being connected between a system bus and a PCI bus wherein at least one of said electronic devices is connected to said PCI bus.

5. The method as set forth in claim 4 wherein at least one of said electronic devices is an adapter device connected to said PCI bus.

6. A method for assigning buffers from a group of buffers in a host-to-PCI bridge circuit, said host-to-PCI bridge circuit being arranged to connect a host bus to a first PCI bus, said first PCI bus being arranged for receiving a first plurality of PCI devices connected thereto, said method comprising:
    assigning an allocation number of buffers from said group to each of said PCI devices;
    marking buffers in said group as available buffers when not being used during an information transfer;
    maintaining a record of a number of said available buffers;
    determining a minimal acceptable number of available buffers necessary to accomplish information transfers at a minimal acceptable transfer efficiency;
    detecting a request for a current information transfer from a requesting one of said PCI devices;
    assigning available buffers for use in said current transfer until a number of buffers being used in said current transfer attains a predetermined relationship with said allocation number for said requesting one of said PCI devices;

after said attainment of said predetermined relationship, assigning additional available buffers for use in said current transfer only so long as a number of available buffers is greater than or equal to said minimal acceptable number of said available buffers.

7. The method as set forth in claim 6 wherein said allocation number is determined in accordance with expected needs of said PCI devices in making information transfers.

8. The method as set forth in claim 6 wherein said allocation number is determined to be a number closest to a number obtained by dividing said total number of buffers in said group by said first plurality of PCI devices.

9. The method as set forth in claim 8 wherein a PCI-to-PCI bridge circuit is arranged to connect said first PCI bus to a second PCI bus, said second PCI bus being arranged for receiving a second plurality of PCT devices, wherein said allocation number assigned to each of said PCI devices is determined in accordance with said total number of buffers in said group divided by a sum total of said first PCI devices and said second PCI devices.

10. The method as set forth in claim 1 and further including:

maintaining an available buffer count in memory, said available buffer count being representative of a number of said available buffers; and decrementing said available buffer count whenever a buffer marked as available has been assigned for use in said current transfer.

11. The method as set forth in claim 6 and further including:

retrying said PCI bus use request if it is determined that said number of available buffers is equal to or less than said minimal acceptable number.

12. The method as set forth in claim 6 and further including:

determining which of said PCI devices was using an identified buffer when said identified buffer was marked as available;

maintaining an assigned count in memory of a number of buffers assigned to each of said PCI devices; and decrementing said assigned count for a specific PCI device whenever said specific PCI device releases a buffer from use in transferring information.

13. The method as set forth in claim 10 and further including:

incrementing said available buffer count whenever a buffer is marked as available.

14. An information processing system comprising:

a host bus;

a PCI bus arranged for connection to a plurality of PCI devices;

a host-to-PCI bridge circuit connecting said host bus to said PCI bus, said host-to-PCI bridge circuit containing a group of buffers for use by said PCI devices in transferring information, said system being selectively operable for:

assigning an allocation number of buffers from said group to each of said devices;

marking buffers in said group as available buffers when not being used during an information transfer;

maintaining a record of a number of said available buffers;

determining a minimal acceptable number of available buffers necessary to accomplish information transfers at a minimal acceptable transfer efficiency;

detecting a request for a current information transfer from a requesting one of said devices;

assigning available buffers for use in said current transfer until a number of buffers being used in said current transfer attains a predetermined relationship with said allocation number for said requesting one of said devices;

after said attainment of said predetermined relationship, assigning additional available buffers for use in said current transfer only so long as a number of available buffers is greater than or equal to said minimal acceptable number of said available buffers.

* * * * *